US012735007B2

(12) United States Patent
Kim

(10) Patent No.: US 12,735,007 B2
(45) Date of Patent: Sep. 15, 2026

(54) ELECTRO-MECHANICAL BRAKE AND CONTROL METHOD THEREFOR

(71) Applicant: HYUNDAI MOBIS CO., LTD., Seoul (KR)

(72) Inventor: Jong Sung Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 31 days.

(21) Appl. No.: 18/989,159

(22) Filed: Dec. 20, 2024

(65) Prior Publication Data

US 2025/0263052 A1 Aug. 21, 2025

(30) Foreign Application Priority Data

Feb. 16, 2024 (KR) ........................ 10-2024-0022416

(51) Int. Cl.
*B60T 8/1766* (2006.01)
*B60T 17/22* (2006.01)
*B60T 13/74* (2006.01)

(52) U.S. Cl.
CPC ............ *B60T 8/1766* (2013.01); *B60T 17/22* (2013.01); *B60T 13/741* (2013.01)

(58) Field of Classification Search
CPC ....... B60T 13/741; B60T 17/22; B60T 8/1766
See application file for complete search history.

(56) References Cited

U.S. PATENT DOCUMENTS

| | | | | |
|---|---|---|---|---|
| 2,903,100 | A * | 9/1959 | Freeman | B60T 8/26 188/349 |
| 5,088,042 | A * | 2/1992 | Brearley | B60T 8/1766 303/9.62 |
| 5,470,134 | A * | 11/1995 | Toepfer | B60T 8/1764 303/9.69 |
| 5,752,747 | A * | 5/1998 | Decker | B60T 13/683 303/9.62 |
| 2007/0188021 | A1* | 8/2007 | Maki | B60T 8/1766 303/9.62 |
| 2024/0010174 | A1* | 1/2024 | Kim | B60T 8/172 |
| 2025/0065858 | A1* | 2/2025 | Kim | B60T 13/748 |

* cited by examiner

*Primary Examiner* — Carl C Staubach
(74) *Attorney, Agent, or Firm* — Novo TechIP International PLLC

(57) ABSTRACT

An electro-mechanical brake including: a plurality of brake pads respectively mounted on front and rear wheels of a vehicle; and a processor configured to correct a first braking distribution ratio to determine a second braking distribution ratio, the braking distribution ratio being a ratio of a magnitude of a rear-wheel braking force distributed to the rear wheels to a magnitude of a front-wheel braking force distributed to the front wheels, wherein the processor calculates a wear amount of each of the plurality of brake pads, and determines the second braking distribution ratio based on the wear amount of each of the plurality of brake pads.

12 Claims, 7 Drawing Sheets

ELECTRO-MECHANICAL BRAKE AND CONTROL METHOD THEREFOR

CROSS-REFERENCE TO RELATED APPLICATIONS

The present application claims priority to Korean Patent Application No. 10-2024-0022416, filed on Feb. 16, 2024, the entire contents of which are incorporated herein by reference.

TECHNICAL FIELD

The present disclosure relates to an electro-mechanical brake and a control method therefor.

BACKGROUND

The content described in this section simply provides background information for the present disclosure and does not constitute the related art.

An electro-mechanical brake (EMB) is a brake apparatus that generates a friction braking force. In the electro-mechanical brake, an actuator that is driven by a motor is mounted on a brake caliper. The electro-mechanical brake presses a wheel disk using a motor, a gear box, a screw, a piston, a brake pad, and the like without a medium called a brake fluid.

The electro-mechanical brake has a similar mechanism to an electronic parking brake (EPB), but the electro-mechanical brake is required to have higher reliability and durability since the electro-mechanical brake is a main braking apparatus that is used during traveling.

When a driver steps on a pedal, the electro-mechanical brake calculates a required braking force and applies a brake command to each wheel. When the brake command is applied, the motor starts rotating and moving the piston forward, and the piston presses the brake pad. The brake pad presses the wheel disk to generate the braking force.

Friction materials such as brake pads wear out due to repeated braking actions and gradually become thinner. Brake pads mounted on front and rear wheels of a vehicle may have different degrees of wear. When the wear of the brake pads exceeds a certain level, it is necessary to replace the brake pads with new brake pads for safe braking.

When such replacement is performed, there may be the inconvenience of having to replace the brake pads of the front and rear wheels separately if the degrees of wear of the brake pads of the front and rear wheels are different. Alternatively, when heavily worn brake pads are replaced, less worn brake pads may also need to be replaced at the same time.

A method capable of adjusting wear amounts and thicknesses of the brake pads of the front and rear wheels of the electro-mechanical brake to similar levels so that brake pad replacement can be performed more conveniently and rationally is required.

SUMMARY

Therefore, the present disclosure has been made to solve these problems, and a main object of the present disclosure is to adjust wear amounts of brake pads of front and rear wheels so that thicknesses of the brake pads are maintained as equal as possible, and enable replacements of the brake pads of the front and rear wheels to be performed at the same timings.

Another main object of the present disclosure is to adjust a braking distribution ratio to adjust wear amounts of brake pads of front and rear wheels while maintaining braking stability.

The problems to be solved by the present disclosure are not limited to the problems described above, and other problems not described can be clearly understood by those skilled in the art from the description below.

An electro-mechanical brake comprising: a plurality of brake pads respectively mounted on front and rear wheels of a vehicle; and a processor configured to correct a first braking distribution ratio to determine a second braking distribution ratio, the braking distribution ratio being a ratio of a magnitude of a rear-wheel braking force distributed to the rear wheels to a magnitude of a front-wheel braking force distributed to the front wheels, wherein the processor calculates a wear amount of each of the plurality of brake pads, and determines the second braking distribution ratio based on the wear amount of each of the plurality of brake pads.

A control method for an electro-mechanical brake including a plurality of brake pads respectively mounted on front and rear wheels of a vehicle, and a processor configured to correct a first braking distribution ratio to determine a second braking distribution ratio, the braking distribution ratio being a ratio of a magnitude of a rear-wheel braking force distributed to the rear wheels to a magnitude of a front-wheel braking force distributed to the front wheels, the control method for an electro-mechanical brake comprising: calculating a wear amount of each of the plurality of brake pads; and determining the second braking distribution ratio based on the wear amount of each of the plurality of brake pads.

As described above, according to the present embodiment, there is an effect that it is possible to adjust wear amounts of the brake pads of the front and rear wheels so that thicknesses of the brake pads are maintained as equal as possible, and perform replacements of the brake pads of the front and rear wheels at the same timings.

Further, the present disclosure has an effect that it is possible to correct the first braking distribution ratio to determine the second braking distribution ratio, and adjust the wear amounts of the brake pads of the front and rear wheels while maintaining braking stability.

In addition, the present disclosure has an effect that it is possible to maintain braking stability since the second braking distribution ratio can be determined to have a different value depending on the wear amount and the magnitude of the required braking force.

DETAILED DESCRIPTION

Figure 1:
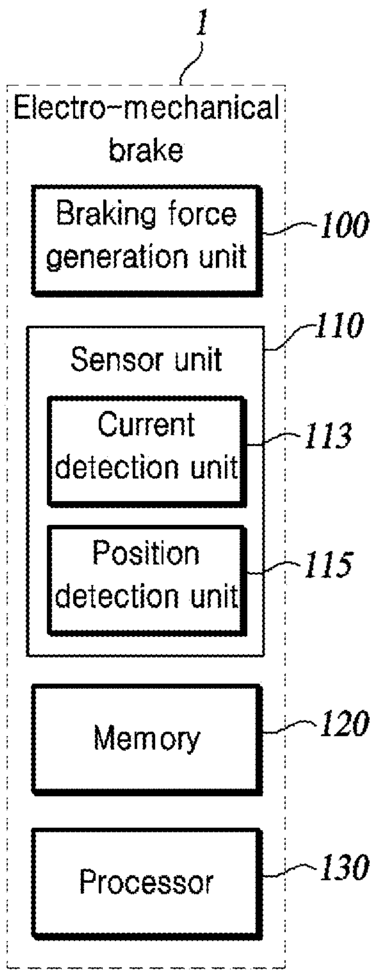
FIG. 1 is a functional block diagram of an electro-mechanical brake according to an embodiment of the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

FIG. 1 is a functional block diagram of an electro-mechanical brake according to an embodiment of the present disclosure.

Figure 2:
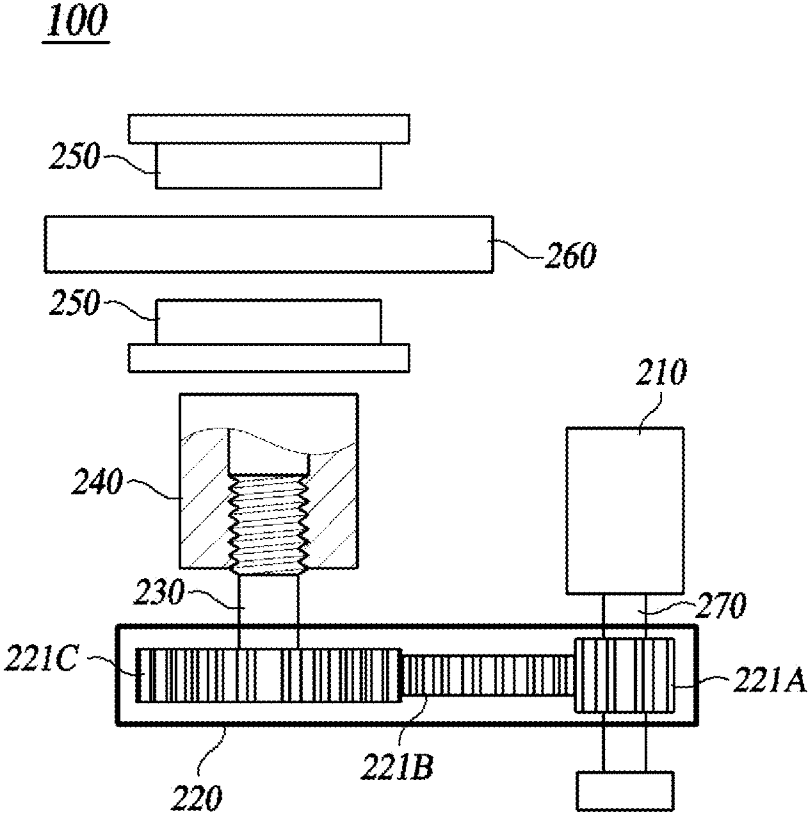
FIG. 2 is a diagram illustrating a braking force generation unit according to an embodiment of the present disclosure.

FIG. 2 is a diagram illustrating a braking force generation unit according to an embodiment of the present disclosure.

Referring to FIGS. 1 and 2, an electro-mechanical brake (EMB) 1 includes all or some of a braking force generation unit 100, a sensor unit 110, a memory 120, and a processor 130. The electro-mechanical brake 1 generates a friction braking force. Since the electro-mechanical brake 1 does not use hydraulic pressure, the electro-mechanical brake 1 has a higher response speed and is more environmentally friendly than a hydraulic brake (not shown). The electro-mechanical brake 1 is capable of independent control of each wheel (not shown), thereby providing high braking stability.

When a driver steps on a brake pedal (not shown), the braking force generation unit 100 calculates a required braking force based on a stroke amount of the driver and then generates the braking force. The braking force generation unit 100 may be mounted on a wheel of a vehicle to generate the braking force. The braking force generation unit 100 may be mounted on each wheel of the vehicle. The braking force generation unit 100 is capable of independent braking force generation and independent control for each wheel. The braking force generation unit 100 changes kinetic energy of the vehicle into heat energy using a friction force, and brakes the vehicle.

The braking force generation unit 100 may include all or some of a motor 210, a gear box 220, a power transfer unit 230, a piston 240, a brake pad 250, a rotation shaft 270, and a wheel disk 260. The braking force generation unit 100 is not limited by the disclosure in the drawings. For example, a shape, size, disposition, and the like of the motor 210, the gear box 220, the power transfer unit 230, the piston 240, the brake pad 250, the rotation shaft 270, and the wheel disk 260 are not limited by the disclosure in the drawings.

The motor 210 rotates to move the piston 240. A direction of the piston 240 used in the present specification is defined. Forward movement means that the piston 240 moves toward the wheel disk 260. Backward movement means that the piston 240 moves in an opposite direction of the wheel disk 260.

According to an embodiment, the motor 210 may be a direct current motor (DC Motor), an alternating current motor (AC Motor), an induction motor, a synchronous motor, a step motor, a servo motor, a brushless direct current motor (BLDC motor), a linear motor, a permanent magnet synchronous motor (PMSM), or the like.

One side of the gear box 220 is connected to the motor 210, and the other side of the gear box 220 is connected to the power transfer unit 230. The gear box 220 is configured to transfer the power of the motor 210 to the power transfer unit 230. The gear box 220 includes a plurality of gears 221 therein. In the gear box 220, the plurality of gears 221 are engaged and rotated so that a rotational force can be amplified. A shape and disposition of the gear box 220 are not limited by the drawings. The plurality of gears 221 are not limited to the shape and the number shown in the drawings.

The power transfer unit 230 may receive power from the gear box 220. The power transfer unit 230 may provide the power to the piston 240.

According to one embodiment, the power transfer unit 230 may be a screw shaft. In this case, the piston 240 may be screw coupled to the screw shaft. In this case, when the screw shaft rotates, the screw coupling is connected or disconnected, and the piston 240 moves forward or backward.

The piston 240 moves with the power transferred from the power transfer unit 230. When the piston 240 moves forward, the piston 240 presses the brake pad 250. The brake pad 250 presses the rotating wheel disk 260 to brake the vehicle.

A pair of brake pads 250 may be provided. The pair of brake pads 250 may be disposed on both sides of the wheel disk 260. The wheel disk 260 is coupled to the wheel of the vehicle and rotates with the wheel. When the piston 240 presses the brake pad 250, the brake pad 250 may press the wheel disk 260. When the brake pad 250 presses the wheel disk 260, the brake pad 250 is compressed and a braking force is generated. As a distance by which the piston 240 moves forward increases, a force with which the brake pad 250 presses the wheel disk 260 increases, and thus, the braking force increases.

The sensor unit 110 may include a current detection unit 113, a position detection unit 115, and the like.

According to one embodiment, the current detection unit 113 may detect a current flowing through the motor 210. For example, a current sensor (not shown) may be included to detect the current flowing through the motor 210. The electro-mechanical brake 1 can control the current flowing through the motor 210 using the current detection unit 113.

According to one embodiment, the position detection unit 115 may detect the position of the piston 240. For example, the position detection unit 115 may include a motor rotation angle sensor (not shown) to detect a rotation angle of the motor 210. As the motor 210 rotates, the piston 240 moves forward or backward. That is, since the position of the piston 240 is determined by the rotation angle of the motor 210, the electro-mechanical brake 1 may detect the position of the piston 240 using the position detection unit 115 including the motor rotation angle sensor.

Figure 3A:
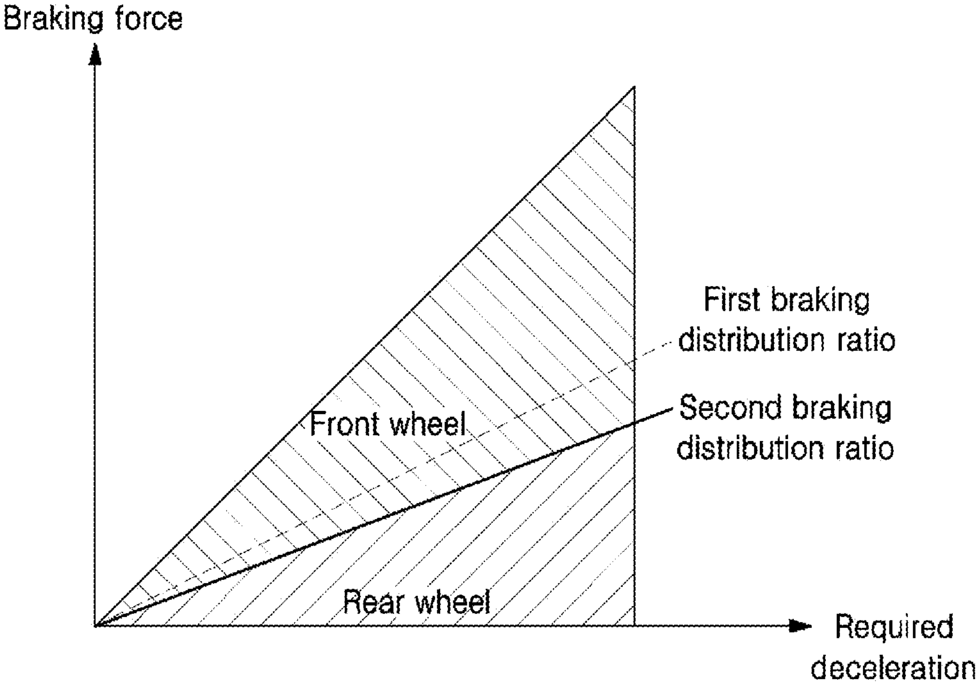
FIGS. 3A and 3B are graphs showing a first braking distribution ratio and a second braking distribution ratio according to an embodiment of the present disclosure.
Figure 3B:
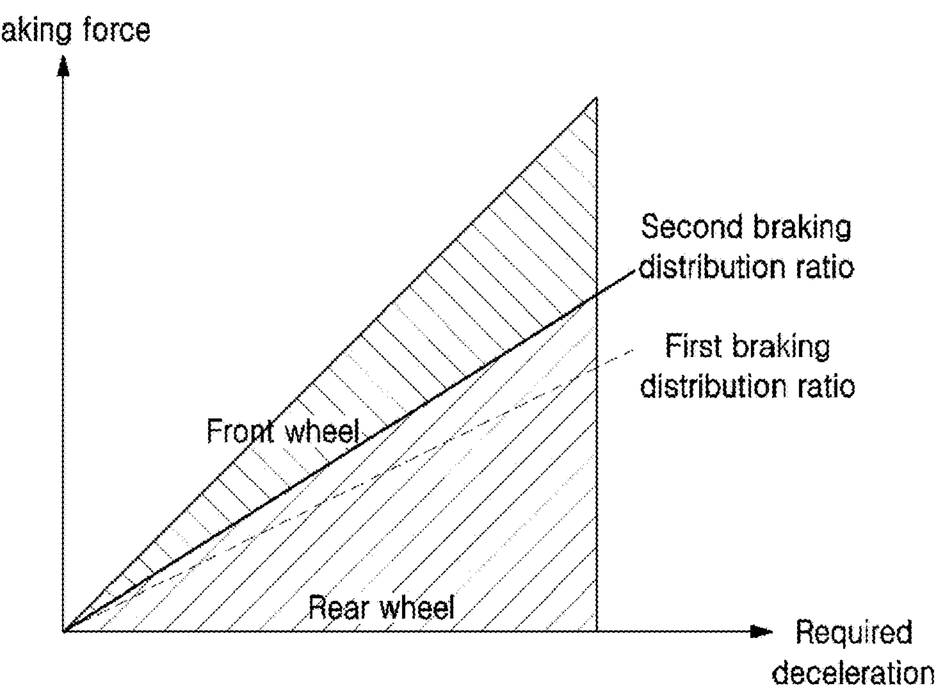

FIGS. 3A and 3B are graphs showing a first braking distribution ratio and a second braking distribution ratio according to an embodiment of the present disclosure.

Referring to FIGS. 3A and 3B, a wear amount refers to a degree to which the brake pad 250 wears or a degree to which a thickness of the brake pad 250 changes. Here, a first wear amount refers to a wear amount of the brake pad 250 mounted on a front wheel. A second wear amount refers to a wear amount of the brake pad 250 mounted on a rear wheel.

Since a vehicle generally has a plurality of wheels including both front and rear wheels, the brake pad 250 may be mounted on both the front and rear wheels. The brake pad 250 wears out due to repeated use, and the first wear amount and the second wear amount may be different.

The processor 130 may change the first braking distribution ratio to balance the first wear amount and the second wear amount. When the wear amounts of the brake pads 250 are not balanced, there may be inconvenience that replacement timings of the more worn brake pads 250 and the less worn brake pads 250 become different. In addition, in some cases, the brake pads 250 need to be all replaced even though the brake pads 250 do not wear much. In order to overcome such disadvantages, the processor 130 adjusts the braking distribution ratio at the time of braking to balance the first wear amount and the second wear amount so that the first wear amount and the second wear amount do not differ from each other.

A braking distribution ratio refers to a ratio of a magnitude of rear-wheel braking force distributed to the rear wheels to a magnitude of front-wheel braking force distributed to the front wheels. Basically, the electro-mechanical brake 1 has a preset braking distribution ratio. In the present specification, the preset braking distribution ratio is defined as the first braking distribution ratio. The first braking distribution ratio is generally set so that the front-wheel braking force is higher than the rear-wheel braking force for braking stability. Further, slopes of the first braking distribution ratio and the second braking distribution ratio disclosed in FIGS. 3 to 5 in the present disclosure are only examples of slopes for explaining the technical spirit of the present disclosure, and the slopes of the first braking distribution ratio and the second braking distribution ratio of the present disclosure are not limited to the slopes shown in the drawing. For example, the slopes of the first braking distribution ratio and the second braking distribution ratio may be set so that the proportion of the braking force distributed to the front wheels is higher than that distributed to the rear wheels.

Since the braking distribution ratio is a ratio of the magnitude of the rear-wheel braking force to the magnitude of the front-wheel braking force, a proportion of the front-wheel braking force increases and a proportion of the rear-wheel braking force decreases when the braking distribution ratio increases. When the braking distribution ratio decreases, the proportion of front wheel braking force decreases and the proportion of rear wheel braking force increases. As described above, for the first braking distribution ratio, the front-wheel braking force is generally set to be higher than rear-wheel braking force for braking stability, and when typical braking force magnitudes for the front and rear wheels are expressed as an example using a proportional formula, the magnitude of the front-wheel braking force may be larger than that of the rear-wheel braking force, for example, front-wheel braking force: rear-wheel braking force=7:3 or front-wheel braking force: rear-wheel braking force=6.5:3.5. That is, the first braking distribution ratio may have a value similar to 2.3 which is 7 divided by 3, or 1.857 which is 6.5 divided by 3.5, for braking stability. However, these values are only examples for description, and a proportional formula of the magnitudes of the braking forces for the front and rear wheels is not limited to 7:3 or 6.5:3.5. The value of the first braking distribution ratio is also not limited by the above value or proportional formula. The proportions of the braking forces for the front and rear wheels may be determined in consideration of various factors such as vehicle specifications, development purpose, and use environment. The processor 130 may calculate the wear amount of each of the brake pads 250 of the front and rear wheels. According to one embodiment, the processor 130 may detect the wear amount of the brake pad 250 based on a signal from the position detection unit 115. For example, when the motor 210 is a BLDC motor, the processor 130 may detect the first wear amount and the second wear amount based on a signal from a motor rotation angle sensor since the motor rotation angle sensor is built in the motor 210.

The processor 130 may correct the first braking distribution ratio to determine the second braking distribution ratio. In the present specification, the second braking distribution ratio refers to a braking distribution ratio when a preset first braking distribution ratio is newly changed.

Since the electro-mechanical brake 1 is capable of independent control for each wheel, the electro-mechanical brake 1 can independently adjust the braking forces that are applied to the front and rear wheels. That is, in the electro-mechanical brake 1, it is possible to change the braking distribution ratio at any time, unlike a hydraulic brake in which it is difficult to change a determined braking distribution ratio.

The processor 130 may determine the second braking distribution ratio based on the wear amount of each of the plurality of brake pads 250 mounted on the vehicle. That is, in order to maintain balance between the first wear amount and the second wear amount, the processor 130 may calculate the wear amount of each of the plurality of brake pads 250 and correct the first braking distribution ratio, which is a preset braking distribution ratio, to determine the second braking distribution ratio.

FIG. 3A shows the first braking distribution ratio and the second braking distribution ratio when the first wear amount is smaller than the second wear amount.

Referring to FIG. 3A, according to one embodiment, the processor 130 may compare the first wear amount with the second wear amount, and determine a value higher than the first braking distribution ratio as the second braking distribution ratio when the first wear amount is smaller than the second wear amount. That is, when the first wear amount is smaller than the second wear amount, the processor 130 may determine a higher braking distribution ratio. When the braking distribution ratio is changed to the second braking distribution ratio higher than the first braking distribution ratio, a ratio of the front wheel braking force to the braking force required for the vehicle increases and the ratio of the rear wheel braking force decreases.

Thus, When the value higher than the first braking distribution ratio is changed to the second braking distribution ratio, the first wear amount increases relatively faster and the second wear amount increases relatively more slowly so that the first wear amount and the second wear amount different from each other can be balanced each time braking is performed, and as a result, the first wear amount and the second wear amount can have similar levels of wear amount.

FIG. 3B shows the first braking distribution ratio and the second braking distribution ratio when the first wear amount is larger than the second wear amount.

Referring to FIG. 3B, according to one embodiment, when the first wear amount is larger than the second wear amount, the processor 130 may determine a value smaller than the first braking distribution ratio as the second braking distribution ratio. When the value smaller than the first braking distribution ratio is determined as the second braking distribution ratio, the first wear amount increases relatively more slowly, and the second wear amount increases relatively faster so that the first wear amount and the second wear amount different from each other are balanced each time braking is performed, and as a result, the first wear amount and the second wear amount may have similar levels of wear amount.

Figure 4A:
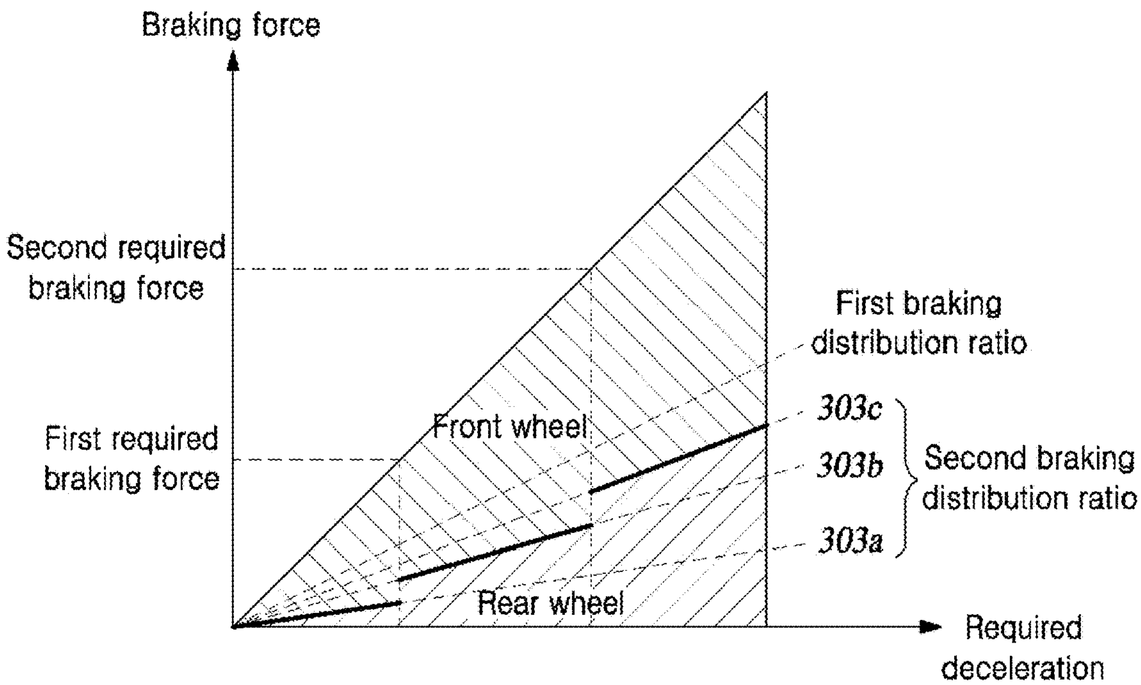
FIGS. 4A and 4B are graphs showing the second braking distribution ratio depending on a magnitude of a required braking force when a first wear amount is smaller than a second wear amount according to an embodiment of the present disclosure.
Figure 4B:
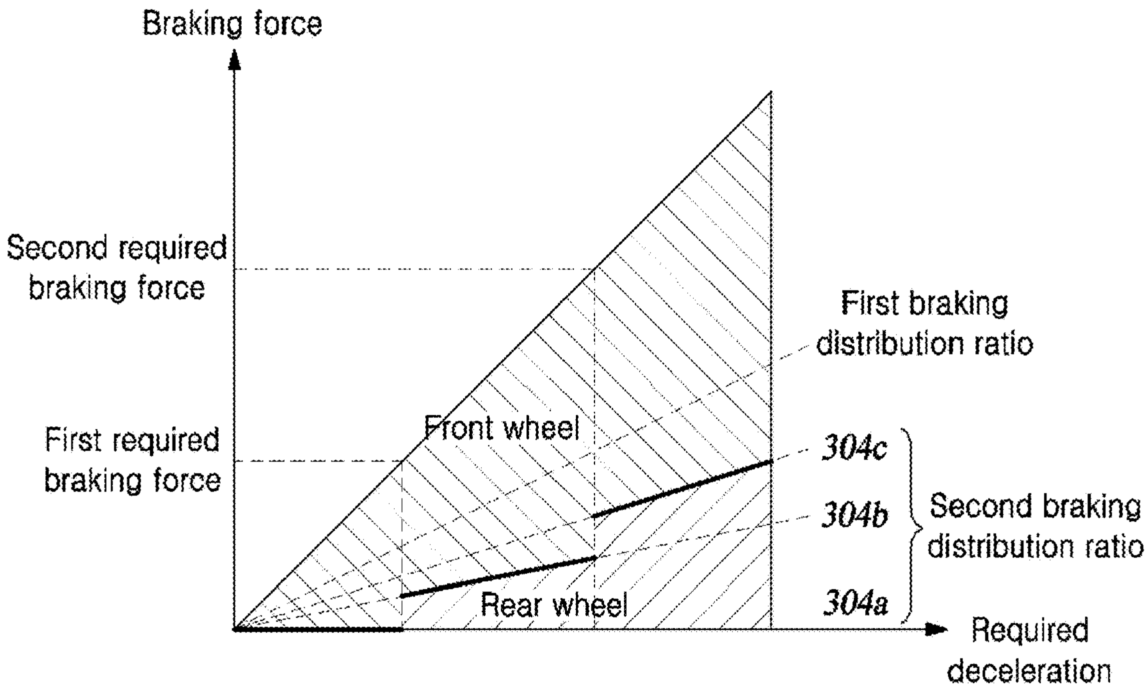

FIGS. 4A and 4B are graphs showing the second braking distribution ratio depending on a magnitude of a required braking force when the first wear amount is smaller than the second wear amount according to an embodiment of the present disclosure.

Referring to FIGS. 4A and 4B, the second braking distribution ratio is higher than the first braking distribution ratio. This is intended to balance the first wear amount and the second wear amount since the second wear amount is larger than the first wear amount. According to one embodiment, the processor 130 may determine the second braking distribution ratio to have a different value depending on the magnitude of the required braking force. This will be described in detail using FIGS. 4A and 4B.

Referring to the graphs of FIG. 4A and FIG. 4B, the first wear amount is smaller than the second wear amount, and the second braking distribution ratio having a different value is applied depending on the magnitude of the required braking force. That is, the processor 130 may apply a different value of the second braking distribution ratio depending on the magnitude of the required braking force. Further, the second braking distribution ratio having a greater value than the first braking distribution ratio is shown.

As in the graphs of FIG. 4A and FIG. 4B, the processor 130 may divide the magnitude of the required braking force to a magnitude equal to or smaller than the first required braking force, a magnitude greater than the first required braking force and equal to or smaller than the second required braking force, and a magnitude greater than the second required braking force to determine the value of the second braking distribution ratio. In FIGS. 4A and 4B, a range of the required braking force is divided into three ranges, but this is only an example and the present disclosure is not limited thereto. In other words, the range of required braking force can be divided into three or more or less ranges. Further, it is desirable to change the braking distribution ratio depending on the magnitude of the required braking force as in FIGS. 4A and 4B only when there is no problem with braking stability. For example, it is desirable to change the braking distribution ratio only in a case where the magnitude of the required braking force is equal to or smaller than a threshold braking force. Here, a case where the required braking force is equal to or smaller than the threshold braking force means a case where the required braking force is a small braking force that does not affect the vehicle stability. When the required braking force is equal to or smaller than the threshold braking force, such change in the braking distribution ratio can be performed since a likelihood of a dangerous situation occurring due to wheel slip or the like is low.

In FIG. 4A and FIG. 4B, the processor 130 may determine the second braking distribution ratio to be a smaller value as the required braking force increases. That is, when the magnitudes of the second braking distribution ratios are compared, 303*a*>303*b*>303*c* in the case of FIG. 4A, and 304*a*>304*b*>304*c* in the case of FIG. 4B.

When the required braking force is equal to or smaller than the first required braking force in FIG. 4A, the braking force is distributed to both the front and rear wheels. On the other hand, when the required braking force is equal to or smaller than the first required braking force in FIG. 4B, the curve 304*a* showing the second braking distribution ratio is parallel to a horizontal axis of the graph and the braking force is distributed to only the front wheels. That is, when the required braking force is equal to or smaller than the first required braking force in FIG. 4B, the braking force is distributed to only the front wheels and the braking force is not distributed to the rear wheels. That is, in the case of FIG. 4B, a greater front wheel braking force than in the case of FIG. 4A is distributed for the same required braking force. That is, in the case of FIG. 4B, an increase rate of the first wear amount will be higher than in the case of FIG. 4A.

Figure 5A:
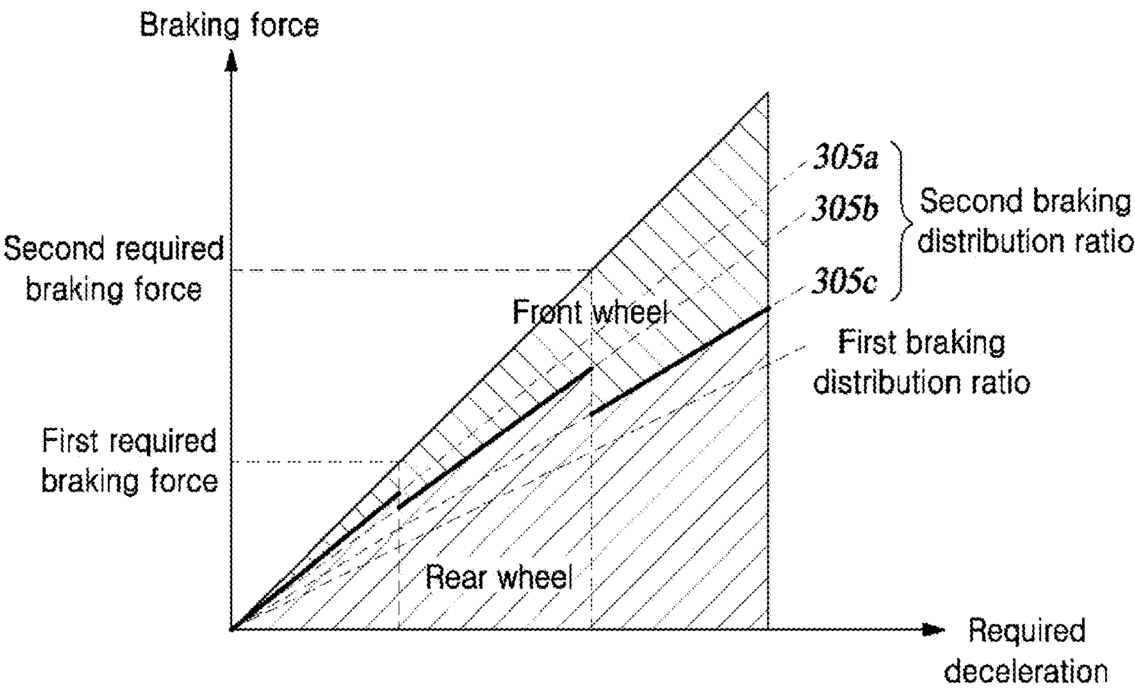
FIGS. 5A and 5B are graphs showing the second braking distribution ratio depending on a magnitude of a required braking force when the first wear amount is larger than the second wear amount according to an embodiment of the present disclosure.
Figure 5B:
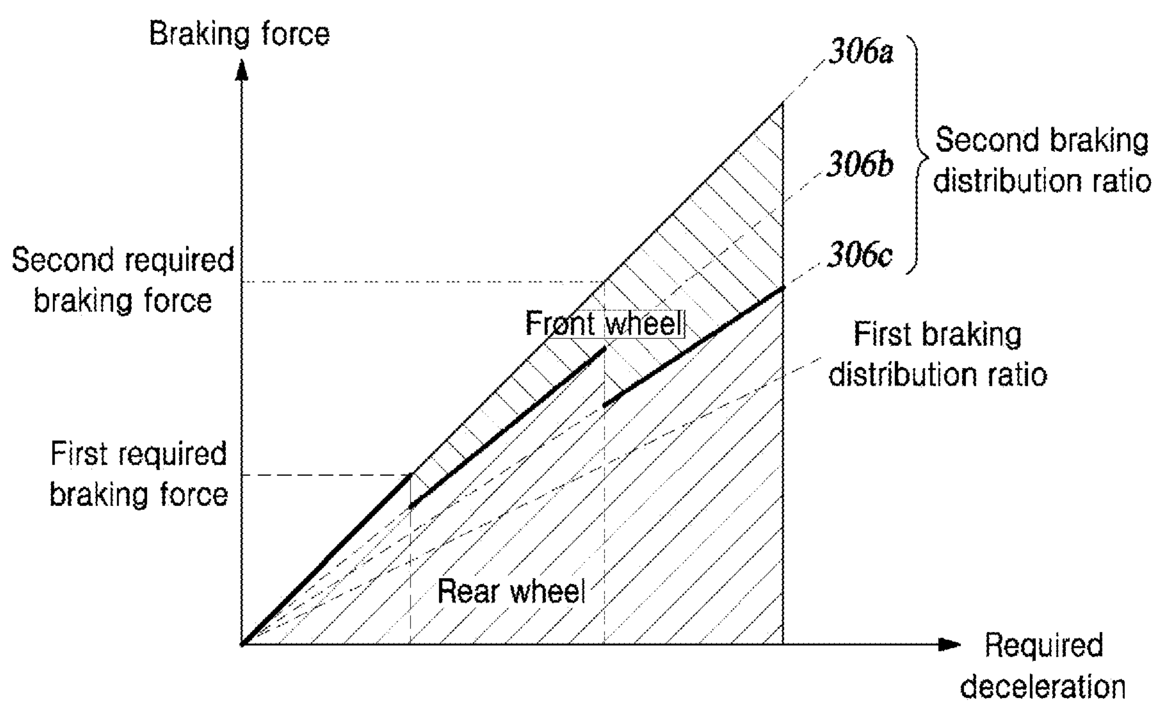

FIGS. 5A and 5B are graphs showing the second braking distribution ratio depending on a magnitude of a required braking force when the first wear amount is larger than the second wear amount according to an embodiment of the present disclosure.

Referring to FIGS. 5A and 5B, the second braking distribution ratio is smaller than the first braking distribution ratio. This is intended to balance the first wear amount and the second wear amount since the second wear amount is smaller than the first wear amount. The processor 130 may determine the second braking distribution ratio to have a different value depending on the magnitude of the required braking force. This will be described in detail using FIGS. 5A and 5B.

Referring to the graphs of FIG. 5A and FIG. 5B, the first wear amount is larger than the second wear amount, and the second braking distribution ratio having a different value is applied depending on the magnitude of the required braking force. The second braking distribution ratio smaller than the first braking distribution ratio is shown. The processor 130 may divide the magnitude of the required braking force to a magnitude equal to or smaller than the first required braking force, a magnitude greater than the first required braking force and equal to or smaller than the second required braking force, and a magnitude greater than the second required braking force to determine the value of the second braking distribution ratio. In FIGS. 5A and 5B, a range of the required braking force is divided into three ranges, but this is only an example and the present disclosure is not limited thereto. In other words, the range of required braking force can be divided into three or more or less ranges. Further, it is desirable to change the braking distribution ratio depending on the magnitude of the required braking force as in FIGS. 5A and 5B only when there is no problem with braking stability. For example, it is desirable to change the braking distribution ratio only in a case where the magnitude of the required braking force is equal to or smaller than a threshold braking force. Here, a case where the required braking force is equal to or smaller than the threshold braking force means a case where the required braking force is a small braking force that does not affect the vehicle stability. When the required braking force is equal to or smaller than the threshold braking force, such change in the braking distribution ratio can be performed since a likelihood of a dangerous situation occurring due to wheel slip or the like is low.

In FIG. 5A and FIG. 5B, the processor 130 may determine the second braking distribution ratio to have a greater value as the required braking force increases. That is, when the magnitudes of the second braking distribution ratios are compared, 305_a_<305_b_<305_c_ in the case of FIG. 5A, and 306_a_<306_b_<306_c_ in the case of FIG. 5B.

When the required braking force is equal to or smaller than the first required braking force in FIG. 5A, the braking force is distributed to both the front and rear wheels. On the other hand, when the required braking force is equal to or smaller than the first required braking force in FIG. 5B, the curve 306_a_ showing the second braking distribution ratio is parallel to a horizontal axis of the graph and the braking force is distributed to only the rear wheels. That is, when the required braking force is equal to or smaller than the first required braking force in FIG. 4B, the braking force is distributed to only the rear wheels and the braking force is not distributed to the front wheels. That is, in the case of FIG. 5B, a greater front wheel braking force than in the case of FIG. 5A is distributed for the same required braking force. That is, in the case of FIG. 5B, an increase rate of the second wear amount will be higher than in the case of FIG. 5A.

Figure 6:
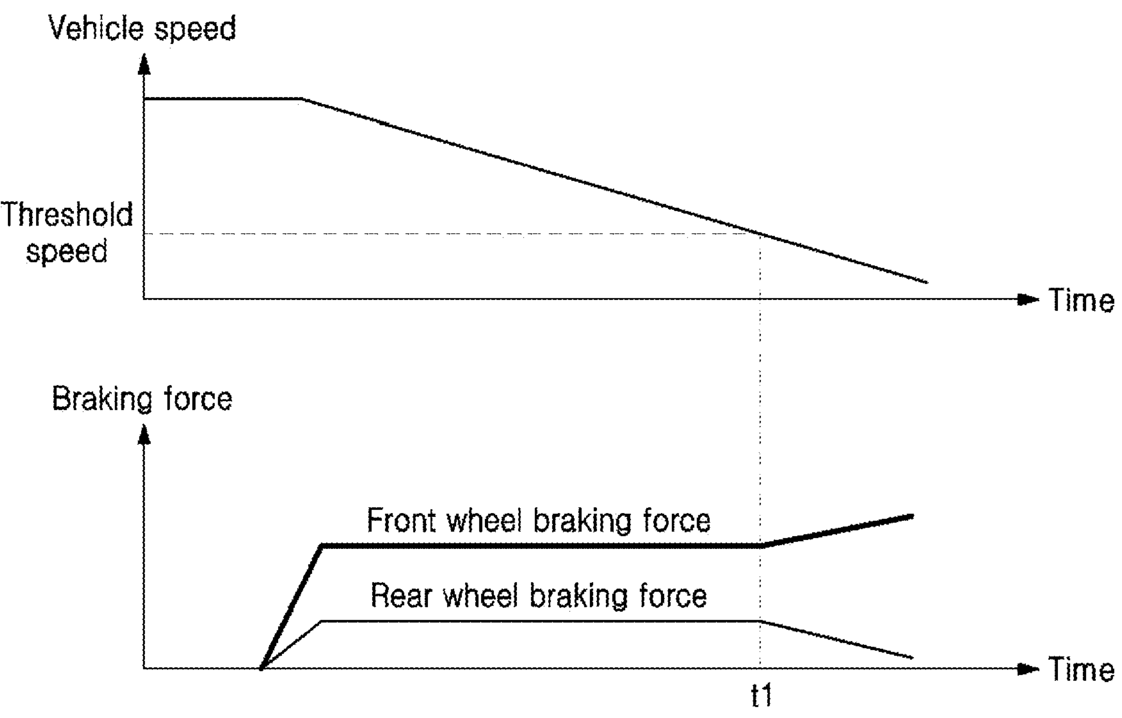
FIG. 6 is a graph showing the braking force with respect to a vehicle speed according to an embodiment of the present disclosure.

FIG. 6 is a graph showing the braking force with respect to a vehicle speed according to an embodiment of the present disclosure.

Referring to FIG. 6, when the first wear amount is smaller than the second wear amount, the speed of the vehicle decreases. The braking distribution ratio does not change and remains at the first braking distribution ratio until the vehicle speed reaches a threshold speed. In other words, the braking distribution ratio has a constant value until a point in time t1 when the vehicle speed reaches the threshold speed. It can be seen from the graph that, at the point in time t1 when the vehicle speed reaches the threshold speed, the first braking distribution ratio is corrected into the second braking distribution ratio, and the proportions of the front-wheel braking force and the rear-wheel braking force change differently. Such control can be applied when a road surface is a low friction road surface. In the case of the low friction road surface, it is desirable to perform control for changing the braking distribution ratio only when there is no problem with braking stability of the vehicle due to a low vehicle speed. Therefore, the processor 130 may maintain the first braking distribution ratio constant when the vehicle speed exceeds the threshold speed, and correct the first braking distribution ratio to determine the second braking distribution ratio only when the vehicle speed is equal to or lower than the threshold speed. In this case, when the first wear amount is smaller than the second wear amount, the processor 130 may determine the value higher than the first braking distribution ratio as the second braking distribution ratio.

Figure 7:
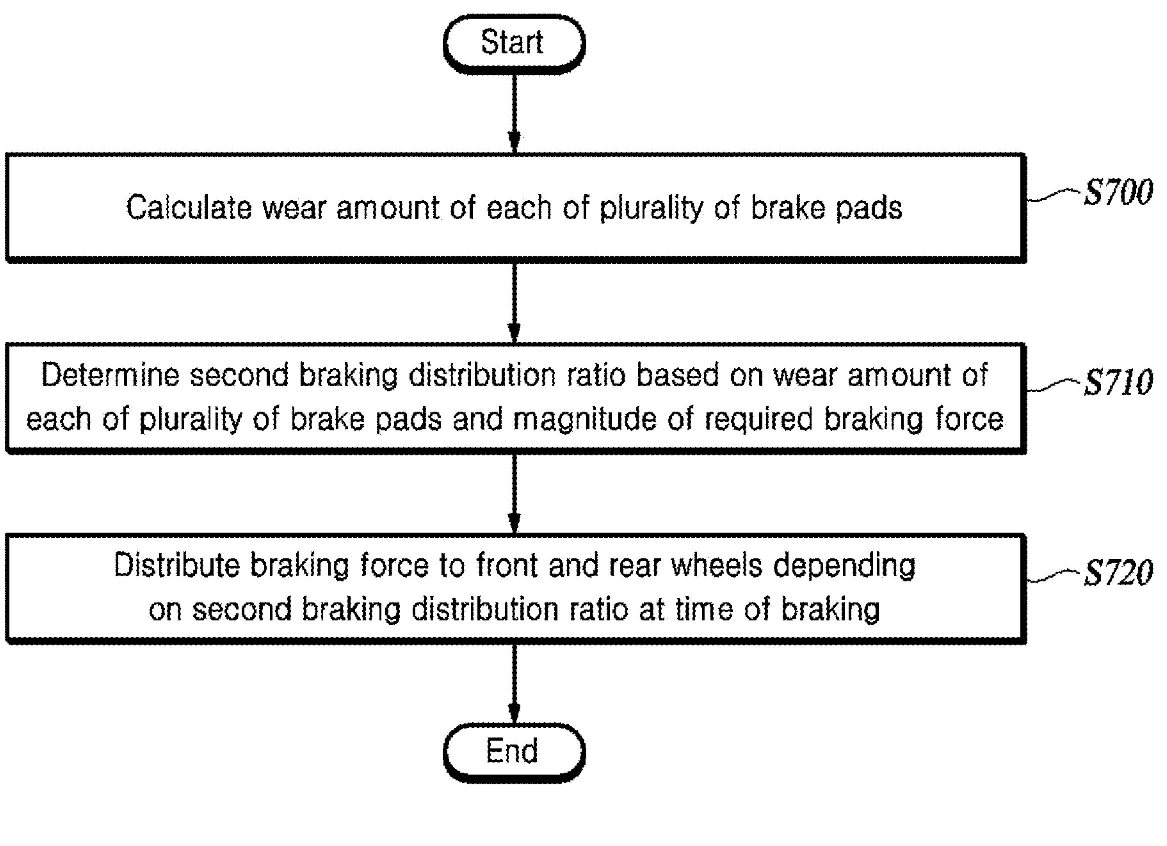
FIG. 7 is a flowchart showing a control method for an electro-mechanical brake according to an embodiment of the present disclosure.

FIG. 7 is a flowchart showing a control method for an electro-mechanical brake according to an embodiment of the present disclosure.

Referring to FIG. 7, the electro-mechanical brake 1 can calculate the wear amount of each of the plurality of brake pads 250 (S700). The electro-mechanical brake 1 can calculate the first wear amount, which is the wear amount of the brake pad 250 of the front wheel, and the second wear amount, which is the wear amount of the brake pad 250 of the rear wheel.

The electro-mechanical brake 1 may determine the second braking distribution ratio based on the wear amount of each of the plurality of brake pads 250 and the magnitude of the required braking force (S710).

The electro-mechanical brake 1 may compare the first wear amount with the second wear amount, determine the value higher than the first braking distribution ratio as the second braking distribution ratio when the first wear amount is smaller than the second wear amount, and determine a value lower than the first braking distribution ratio as the second braking distribution ratio when the first wear amount is larger than the second wear amount. That is, when there is a difference between the first wear amount and the second wear amount, the electro-mechanical brake 1 determines the second braking distribution ratio so that the difference between the first wear amount and the second wear amount is reduced. In this case, the thicknesses of the plurality of brake pads 250 are maintained at the same level so that the plurality of brake pads 250 can all be replaced at the same timings.

The electro-mechanical brake 1 may determine the second braking distribution ratio in consideration of not only the wear amount but also the magnitude of the required braking force. For example, the electro-mechanical brake 1 may determine the second braking distribution ratio to be a braking distribution ratio having different values depending on the magnitude of the required braking force as in FIGS. 4A and 4B or FIGS. 5A and 5B. In other words, the braking distribution ratio can be determined differently in consideration of the braking stability according to the required braking force. For example, when the required braking force is equal to or smaller than the first required braking force that does not relatively cause a problem with the braking stability, it is also possible to determine the second braking distribution ratio so that the braking force is distributed to only any one of the front and rear wheels.

The electro-mechanical brake 1 can distribute the braking force to the front and rear wheels depending on the second braking distribution ratio at the time of braking (S720).

What is claimed is:

1. An electro-mechanical brake comprising:

a plurality of brake pads respectively mounted on plurality of wheels of a vehicle including front and rear wheels; and a processor configured to correct a first braking distribution ratio to determine a second braking distribution ratio, each of the first and second braking distribution ratios being a ratio of a magnitude of a rear-wheel braking force distributed to the rear wheel to a magnitude of a front-wheel braking force distributed to the front wheel, wherein the processor is further configured to:

calculate a wear amount of each of the plurality of brake pads; and determine the second braking distribution ratio based on the wear amount of each of the plurality of brake pads;

wherein the processor is further configured to determine the second braking distribution ratio depending on a magnitude of a required braking force; and wherein the processor is further configured to determine the second braking distribution ratio so that a braking force is generated only for one of the front wheel and the rear wheel when the magnitude of the required braking force is equal to or smaller than that of a first required braking force.

2. The electro-mechanical brake of claim 1, wherein the processor is further configured to:

compare a first wear amount of the brake pad mounted on the front wheel with a second wear amount of the brake pad mounted on the rear wheel;

determine a first value higher than the first braking distribution ratio as the second braking distribution ratio when the first wear amount is smaller than the second wear amount; and determine a second value smaller than the first braking distribution ratio as the second braking distribution ratio when the first wear amount is larger than the second wear amount.

3. An electro-mechanical brake comprising:

a plurality of brake pads respectively mounted on plurality of wheels of a vehicle including front and rear wheels; and a processor configured to correct a first braking distribution ratio to determine a second braking distribution ratio, each of the first and second braking distribution ratios being a ratio of a magnitude of a rear-wheel braking force distributed to the rear wheel to a magnitude of a front-wheel braking force distributed to the front wheel, wherein the processor is further configured to:

calculate a wear amount of each of the plurality of brake pads; and determine the second braking distribution ratio based on the wear amount of each of the plurality of brake pads;

wherein the processor is further configured to determine the second braking distribution ratio depending on a magnitude of a required braking force;

wherein the processor is further configured to determine a value higher than the first braking distribution ratio as the second braking distribution ratio when a first wear amount of the brake pad mounted on the front wheel is smaller than a second wear amount of the brake pad mounted on the rear wheel, the second braking distribution ratio being determined to be a smaller value as the required braking force increases; and wherein the processor is further configured to determine the second braking distribution ratio so that a braking force is generated only for the front wheel when the magnitude of the required braking force is equal to or smaller than that of a first required braking force.

4. The electro-mechanical brake of claim 1, wherein the processor is further configured to:

maintain the first braking distribution ratio when a speed of the vehicle exceeds a threshold speed, and correct the first braking distribution ratio to determine the second braking distribution ratio only when the speed of the vehicle is lower than the threshold speed.

5. The electro-mechanical brake of claim 4, wherein the processor is further configured to determine a value higher than the first braking distribution ratio as the second braking distribution ratio when a first wear amount of the brake pad mounted on the front wheel is smaller than a second wear amount of the brake pad mounted on the rear wheel.

6. A method of controlling an electro-mechanical brake including (1) a plurality of brake pads respectively mounted on a plurality of wheels of a vehicle including front and rear wheels, and (2) a processor configured to correct a first braking distribution ratio to determine a second braking distribution ratio, the braking distribution ratio being a ratio of a magnitude of a rear-wheel braking force distributed to the rear wheel to a magnitude of a front-wheel braking force distributed to the front wheel, the method comprising:

calculating a wear amount of each of the plurality of brake pads;

determining the second braking distribution ratio based on the wear amount of each of the plurality of brake pads;

determining the second braking distribution ratio depending on a magnitude of a required braking force; and determining the second braking distribution ratio so that a braking force is generated only for one of the front wheel and the rear wheel when the magnitude of the required braking force is equal to or smaller than that of a first required braking force.

7. The method of claim 6, wherein determining the second braking distribution ratio comprises:

comparing a first wear amount of the brake pad mounted on the front wheel with a second wear amount of the brake pad mounted on the rear wheel; and determining a first value higher than the first braking distribution ratio as the second braking distribution ratio when the first wear amount is smaller than the second wear amount, and determining a second value smaller than the first braking distribution ratio as the second braking distribution ratio when the first wear amount is larger than the second wear amount.

8. The electro-mechanical brake of claim 1, wherein the processor is further configured to detect the wear amount of each brake pad based on a motor rotation angle detected by a motor rotation angle sensor.

9. The electro-mechanical brake of claim 1, wherein the processor is further configured to divide the magnitude of the required braking force into a plurality of ranges and to determine the second braking distribution ratio differently for each of the plurality of ranges.

10. The electro-mechanical brake of claim 1, wherein the processor is further configured to determine the second braking distribution ratio to have a greater value than the first braking distribution ratio when the first wear amount is smaller than the second wear amount.

11. The electro-mechanical brake of claim 1, wherein the processor is further configured to determine the second braking distribution ratio to have a smaller value than the first braking distribution ratio when the first wear amount is larger than the second wear amount.

12. The electro-mechanical brake of claim 1, wherein the processor is further configured to determine the first required braking force as a threshold braking force below which changes to the second braking distribution ratio do not affect vehicle stability.

* * * * *